(12) United States Patent
Harley et al.

(10) Patent No.: US 8,964,782 B2
(45) Date of Patent: Feb. 24, 2015

(54) MULTI-RATE TRANSPARENT MUX FOR OPTICAL COMMUNICATIONS NETWORKS

(75) Inventors: James Harley, Nepean (CA); Ronald J. Gagnon, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 854 days.

(21) Appl. No.: 12/877,678

(22) Filed: Sep. 8, 2010

(65) Prior Publication Data

US 2011/0032950 A1 Feb. 10, 2011

Related U.S. Application Data

(63) Continuation of application No. 11/533,932, filed on Sep. 21, 2006, now Pat. No. 7,809,017.

(51) Int. Cl.
*H04J 3/24* (2006.01)
*H04J 3/07* (2006.01)
*H04J 3/16* (2006.01)

(52) U.S. Cl.
CPC ........ *H04J 3/07* (2013.01); *H04J 3/1652* (2013.01)
USPC ............ 370/474; 370/465; 370/477; 709/236

(58) Field of Classification Search
None
See application file for complete search history.

(56) References Cited

U.S. PATENT DOCUMENTS 8,274,892 B2 * 9/2012 Chiang et al. ............... 370/235
2004/0062277 A1 * 4/2004 Flavin et al. ............... 370/474

* cited by examiner

*Primary Examiner* — Jackie Zuniga Abad
(74) *Attorney, Agent, or Firm* — Christopher & Weisberg, P.A.

(57) ABSTRACT

Bit-transparent muxing of an input signal for transport through an optical communications network is disclosed. A stuffing ratio is based on a line rate of the input signal and a data rate of a fixed length container. A number (NFS) of fixed stuffs is computed based on the stuffing ratio. The input signal and NFS fixed stuffs are inserted into the payload of the container, and the computed number of NFS are stored in the container's overhead. In some embodiments, the container is an overclocked OTU-3 (OTU3+) frame having a line rate of 44.6 Gb/s. This enables bit-transparent mux/demux of four nominal 10 Gig signals having line rates within a range of between 7.6 Gb/s and 10.4 Gb/s, or a single nominal 40 Gig signal having a line rate within a range of between 38.8 Gb/s and 41.6 Gb/s.

8 Claims, 4 Drawing Sheets

Line Rate=25Gb/s
C=22.97Gb/s

MULTI-RATE TRANSPARENT MUX FOR OPTICAL COMMUNICATIONS NETWORKS

CROSS-REFERENCE TO RELATED APPLICATIONS

This application is a continuation of U.S. application Ser. No. 11/533,932, the entirety of which is hereby incorporated by reference.

TECHNICAL FIELD

The present invention relates to optical communications networks, and in particular to a methods of multiplexing lower rate signals into a flexible multi-rate transparent MUX for optical communications networks.

BACKGROUND OF THE INVENTION

In the optical communications space, demand for ever-increasing bandwidth has lead to the development of systems operating at a nominal line rates of 10 Gb/s and 40 Gb/s. One such system is the Optical Transport Network (OTN), which is described in general terms in ITU-T G.872. ITU-T G.709 provides the network interface definitions for the OTN.

In general, G.709 defines a set of Optical Transport Units (OTUs) which provide overhead, payload capacity and Forward Error Correction (FEC) for respective different bandwidths. As may be seen in FIG. 1, three OTUs (OTU-1, OTU-2 and OTU-3) are defined, each of which is composed of a 4080 column frame 2 consisting of 16 columns of Operations And Maintenance (OAM) overhead 4; 3808 columns of payload 6; and 256 columns of FEC 8. Taken together, the OAM overhead 4 and payload 6 form a 3824-column Optical Data Unit (ODU) 10 which can be MUXed into a higher orderOTU frame 2. The line rate of each OTU is selected to facilitate bit-transparent transport of conventional SONET/SDH signals, as well as multiplexing of four lower-order ODUs. Thus, an OTU-1 operates at 2.66 Gb/s to support a 2.488 Gb/s OC-48 signal. An OTU-2 frame operates at 10.709 Gb/s to support a 9.953 Gb/s OC-192 signal, or mux four ODU-1s. An OTU-3 frame operates at 43.018 Gb/s to support a 39.813 Gb/s OC-768 signal, or mux four ODU-2s.

A limitation of the above arrangement is that some constant bit rate (CBR) clients demand bit-transparent transport of signals that do not conform to SONET/SDH line rate conventions. For example, 10 G Ethernet PHY-layer signals operate at a line rate of 10.3 Gb/s. Various methods have been proposed for compressing a 10 G Ethernet-PHY signal to facilitate transport at the OC-192 line rate. See, for example, Applicant's U.S. Pat. No. 6,944,163, which issued Sep. 13, 2005. However, in each of these methods, the process of compressing and de-compressing Ethernet media access control (MAC) frames introduces artefacts (e.g. null-frames removed, inter-frame gaps compressed etc.) into the recovered Ethernet signal. In some cases, these artefacts produce an undesirable degradation in the signal quality, which has led affected clients to demand true bit-transparent transport of their signal traffic. In this respect, "bit transparent" implies that an input signal can be mapped into a suitable container, transported across the network, and then de-mapped to recover the original signal, without introducing artefacts that are detectable by the client.

One known method of accommodating this requirement is by overclocking an OTU-2 signal to provide an OTU2+ frame, in which the line rate is increased to accommodate a higher-rate client signal. For example, increasing the line rate of the OTU-2 signal from 10.709 Gb/s to 11.095 Gb/s enables the resulting OTU2+ to support transparent mapping of 10 G Ethernet PHY-layer client signals. The overclocked OTU-2 (OTU-2+) signal is a logical OTU-2 signal, which can therefore be processed through a conventional OTU-2 capable Application Specific Integrated Circuit (ASIC). However, this solution suffers a disadvantage that a different line rate is required to support transparent mapping of different client signals, which leads of a plurality of different OTN frame rates.

An alternative solution is to use a non-OTN frame to provide transparent mapping of client traffic. This is inevitably a proprietary solution, which defeats the interoperability and network management benefits of adhering to a standards-based transport-layer solution.

While the above limitations are discussed in terms of the OTN described in ITU-T G.872 and G.709, it will be appreciated that the same limitations will be encountered in any optical communications system in which client signal traffic is muxed into a hierarchy of fixed-size containers for transport through the network.

The above discussion illustrates a specific example of a more general problem, in that the lines rates demanded for client traffic may or may not correspond with the line rates used within the transport network. Traditionally, this problem has been addressed by designing transport network standards in which line rates are selected based on assumptions about the client traffic. The OTN described in ITU-T G.872 and G.709 is a typical example of this, in that the OTN line rates are selected on the assumption that the client traffic will run at SONET line rates. Transparent transport of higher speed client traffic forces the transport network operate at correspondingly higher line rates, and this is typically accomplished by either overclocking an existing transport network, or providing an alternate (usually proprietary) transport network solution.

However, it is entirely possible, even likely, that the most cost effective line rates (e.g. in terms of cost/bit/km) within the transport network are entirely different from those suggested by the demands of client traffic. For example, optical communications networks currently being deployed are designed to run at nominal lines rates of 10 Gb/s and 40 Gb/s, per channel, primarily because these line rates directly accommodate SONET and Ethernet client traffic. However, with current optical networking technology, line rates of between 20 and 30 Gb/s, per channel, may be significantly more cost-effective for the transport network provider.

Accordingly, a flexible multi-rate MUX enabling bit-transparent transport of client traffic having a wide range of line rates through an optical network would be highly desirable.

Techniques enabling transport network line rates to be provisioned independently of client traffic line rates would also be highly desirable.

SUMMARY OF THE INVENTION

An object of the present invention is to provide a flexible multi-rate MUX enabling bit-transparent transport of client traffic having a wide range of line rates through an optical network.

Thus, an aspect of the present invention provides a method of bit-transparent MUXing a client signal into a fixed-length container for transport through an optical communications network. A stuffing ratio ($\alpha$) is computed based on a line rate of the input signal and a payload capacity of the container. A number ($N_{FS}$) of fixed stuffs is calculated based on the stuffing ratio ($\alpha$). $N_{FS}$ fixed stuffs are inserted into a payload of the container, and bytes of the client signal inserted into a residual portion of the payload of the container. The computed number $N_{FS}$ is then stored in a predetermined location of the container.

A further aspect of the present invention provides an interface for bit-transparent MUXing of a plurality of client signals for transport through an optical communications network. At least one client facing MUX block is provided for MUXing at least one client signal into an intranode transport container having a predetermined payload capacity. A network facing MUX-block is provided for MUXing at least one intranode transport container into a transport network container of the optical communications network. At least the client facing MUX blocks implement the bit-transparent MUXing method described above.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a flexible multi-rate MUX enabling bit-transparent transport of client signals having a wide range of line rates. Embodiments of the present invention are described below, by way of example only, with reference to FIGS. 1-6.

In general, the present invention provides a fixed-size transport container 12 including, at a minimum, overhead 14 and payload 16. A transport network line rate may be selected by the network provider, as desired, and this selected line rate governs the payload capacity of the transport container 12. For example, a network line rate of 25 Gb/s may be selected to optimize cost/bit/km, and this line rate may yield a payload capacity of, say, 22.97 Gb/s for a particular transport container format.

Preferably, the overhead 14 supports at least Operations and Maintenance (OAM) and path integrity functions well known in the art. In some embodiments, the transport container 12 is a logical OTU frame, which provides both path and OAM overhead, payload, and FEC.

The transport container 12 can support transparent Muxing of any client signal having a line rate that is equal to or less than the data capacity of the container 12. In accordance with the present invention, such client signals are MUXed into the container 12 at their native line rate, so that introduction of any MUX/DEMUX artefacts is avoided. Any unused payload capacity of the container 12 is filled with a combination of fixed stuffs and byte stuffs, and the number of fixed stuffs inserted into the container overhead to facilitate destuffing at a receiver. This arrangement is advantageous in that a common MUX/DEMUX ASIC can support bit-transparent transport of client signals having virtually any line rate up to and including the maximum payload capacity of the container.

Figure 1:
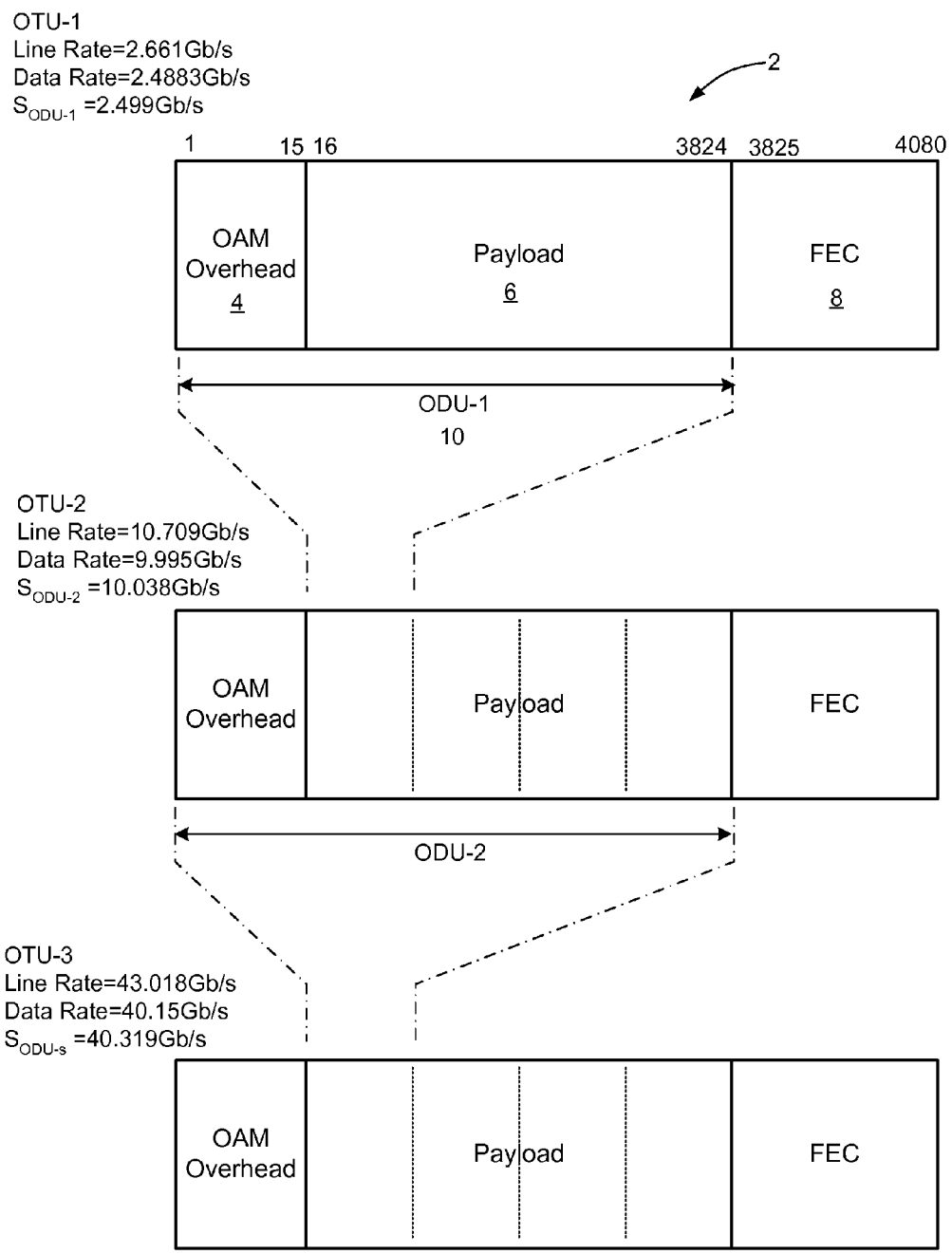
FIG. 1 is a block diagram schematically illustrating conventional OTN frame format and MUXing.
Figure 2:
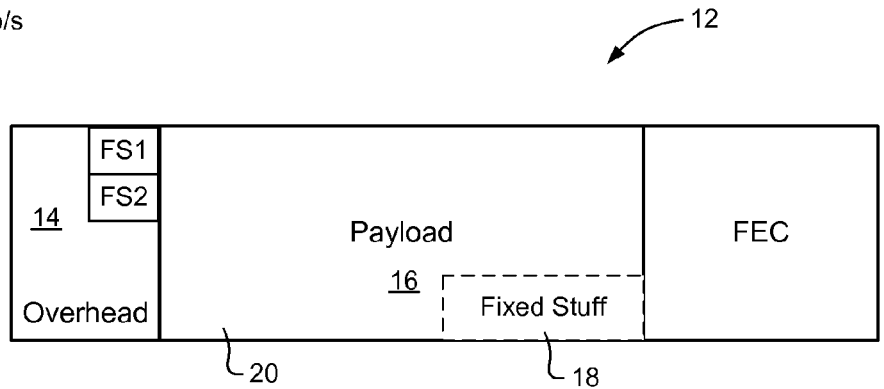
FIG. 2 is a block diagram schematically illustrating a container in accordance with an embodiment of the present invention.
Figure 3:
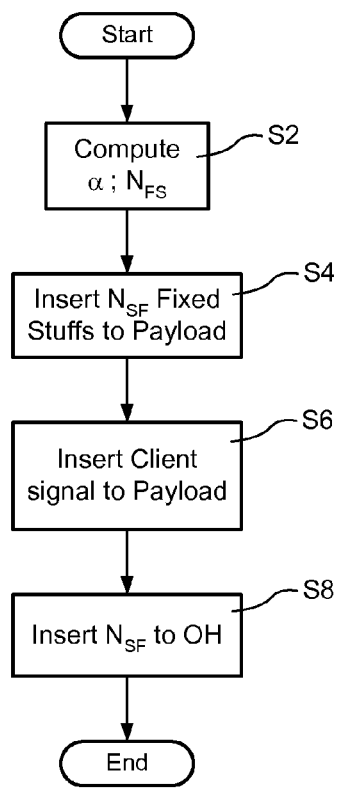
FIG. 3 is a flow chart illustrating a method in accordance with a representative embodiment of the present invention.

Preferably, fixed stuffs are used to compensate for coarse differences between the client line rate and the container's payload capacity. With the client line rate and container payload capacity thus centered, positive and negative byte stuffs can be used to compensate for real-time variations in the client signal line rate and/or the transport network clock. As shown in FIG. 3, some embodiments, client signals are MUXed into the transport container 12 by computing (at step S2) a stuffing ratio ($\alpha$) between the client signal line rate (S) and the payload capacity (C) of the transport container. Thus:

$$\alpha = \frac{C}{S} - 1 \qquad \text{(equ. 1)}$$

The parameters S and C may be fixed values determined from the respective nominal clock speeds of the client signal and the transport network. Alternatively, S and C can be determined in near real-time by monitoring the client signal and transport network clock using known methods. In either case, the stuffing ratio ($\alpha$) can then be used to compute a number ($N_{FS}$) of "fixed stuffs" which are needed to compensate the difference between C and S. Thus:

$$N_{FS} = (P)\alpha \qquad \text{(equ. 2)}$$

Where (P) is the size of the container payload 16. For example, for the specific case in which the transport container is a logical OTN frame, P=3808 32-bit words. The computed number $N_{FS}$ of fixed stuffs 18 can then be inserted into the container payload 16 (at step S4), which effectively reduces the payload capacity to match the nominal line rate of the client signal. Bytes of the client signal can thus be inserted into the remaining container payload 20 (at step S6) in a manner known in the art.

As is known in the art, high speed signals typically vary within a range of about ±100 ppm around the provisioned "nominal" speed. Rather than attempt to re-compute $N_{FS}$ in real-time to compensate for these small scale variations, positive and negative byte-stuffing can be used. In this case, a FIFO fill or Phase-Locked Loop (PLL) can be used in a known manner to insert positive or negative stuff bytes to achieve a phase/frequency lock between the client signal and the transport container.

In order to facilitate proper DEMUXing of the client signal at a receiver, the number $N_{SF}$ is preferably inserted into the container overhead (at step S8). With this arrangement, the range of client signal line rates that can be supported by the transport container 12 is limited by the size of each fixed stuff, and the manner in which $N_{FS}$ is represented. For example, consider an embodiment a logical OTN frame is used as the transport container 12, with a transport network line rate of 25 Gb/s; each fixed stuff is a 32-bit word, and $N_{FS}$ is a single byte value. In this case, client signal line rates of between S=21.06 Gb/s and S=C=22.97 Gb/s can be supported.

As will be appreciated, DEMUXing client traffic from transport containers at a receiver, can readily be accomplished using the number $N_{FS}$ extracted from successive received containers. Thus, for example, the number $N_{FS}$ can be read from a received container, and used to separate client traffic data (and any byte-stuffs) from the fixed stuffs stored in the container payload. Known methods can then be used to remove the byte stuffs from the client traffic data in order to produce a recovered client signal which retains the original format and timing of the client signal.

In some embodiments, it may be desirable to represent the value of $N_{FS}$ using a pair of bytes (e.g. FS1 and FS2). This enables an increase in the range of client signal line rates that can be supported and/or an increase in the granularity. For example, FS1 may be used to indicate the number of "whole" stuffs (e.g. 32-bit words), while FS2 indicates a "fractional" stuff. As may be appreciated, it is a simple matter to insert an integer number (i.e. FS1=33) of whole fixed stuffs into the container payload 16. A fractional fixed stuff (e.g. FS2=0.125) can be accommodated in a variety of ways. For example, an additional (whole) fixed stuff may be inserted into each Nth container frame, where N=1/FS2. Thus, following the above example, the fractional component FS2=0.125 could be accommodated by inserting an additional whole (32-bit) fixed stuff into the payload of every $1/0.125=8^{th}$ container. Alternative methods may include reducing the granularity of each fixed stuff, and/or enabling the insertion of a "partial" fixed stuff into the container payload, or some combination of all of these.

Those of ordinary skill in the art will recognise that the OAM overhead 4 (FIG. 1) defined by G.709 contains a number of unallocated fields (each of which is one byte in size), which may be used to store FS1 and FS2. Two such fields are located in column 15, at rows 1 and 2, of the OAM overhead 4, although others may be used, if desired.

Similarly, it will be appreciated that the size of a fixed stuff is not limited to 32-bit words, and $N_{FS}$, FS1 and FS2 may indicate the amount of fixed stuff in any convenient units, such as bits, bytes, 32-bit words, or any other suitable unit of measure. Similarly, $N_{FS}$, FS1 and FS2 may be represented using any suitable data unit. For example, where a fine granularity or a wide range of supported line rates is not required, FS1 and FS2 may be defined as 4-bit nibbles.

In some embodiments, it may be desirable to subdivide the container payload 16 into sectors, so as to support two or more lower rate client signals. In such cases, the above described calculation of the stuffing ratio ($\alpha$), $N_{FS}$, FS1 and FS2 is preferably repeated for each sector, taking into account the respective payload capacity of the sector under consideration and the line rate of the client signal being mapped into it. In simplified versions, the payload may be subdivided into sectors of equal size. With this arrangement, each sector has a payload capacity of $$C_S = \frac{C}{n_S},$$

where $n_s$ is the number of sectors, and the stuffing ratio is calculated using:

$$\alpha = \frac{C_S}{S} - 1 \quad \text{(equ. 1a)}$$

The number ($N_{FS}$) of "fixed stuffs", which are used to fill the unused portion of each sector of the container payload (P) is then:

$$N_{FS} = \left(\frac{P}{n_S}\right)\alpha \quad \text{(equ. 2a)}$$

Figure 4:
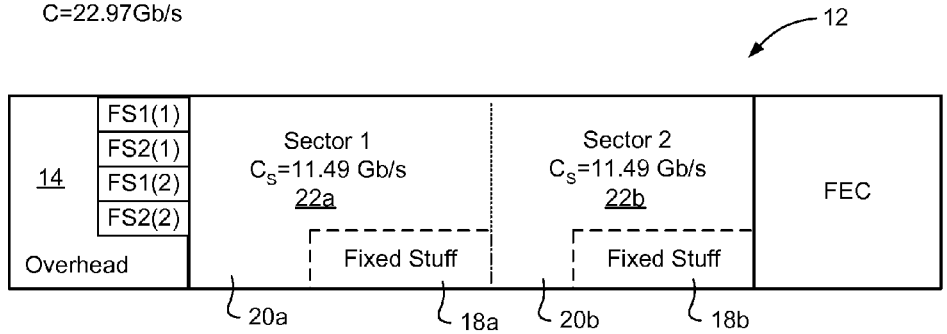
FIG. 4 is a is a block diagram schematically illustrating a container in accordance with a second embodiment of the present invention.

For example, in the embodiment of FIG. 4, the payload of the above described 25 Gb/s transport container 12 is subdivided into $n_s=2$ sectors 22 of equal size. For convenience, assume that each fixed stuff is a 32-bit word, and $N_{FS}$ is a single byte, as in the previous examples. In this case, each sector 22 will be able support a respective client signal having a line rate of between S=9.58 Gb/s and $S=C_S=11.49$ Gb/s. It will be noted that this range of line rates implies that each sector 22 can seamlessly support transparent MUX/DEMUX of OC-192, OTU-2, 10 G Ethernet PHY-layer, and over-clocked OTU-2 (OTU-2+) client signalling. Inserting the number ($n_s$) of sectors into the container overhead 14, along with FS1 and FS2, provides sufficient information to enable successful DEMUXing at the receiver. Preferably, a respective value of $N_{FS}$ is computed for each sector, and corresponding values of $FS1_i$ and $FS2_i$ saved in the container overhead 14. This enables respective different client signals to be MUXed into each sector.

Figure 5:
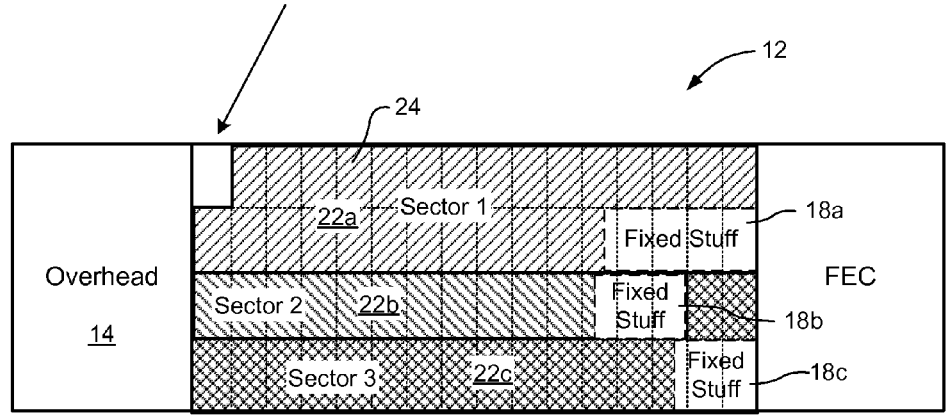
FIG. 5 is a is a block diagram schematically illustrating a container in accordance with a third embodiment of the present invention.

In a more sophisticated embodiment, each sector has a respective different size. One method of accomplishing this is to partition the payload into blocks 24 of equal size, and then assign one or more blocks 24 to each sector 22. For example, FIG. 5 illustrates an embodiment in which the payload 16 is partitioned into 32 blocks 24, each of which is 385 bytes in size. With this arrangement, up to 32 sectors 22 can be defined, by assigning blocks 24 to each sector 22 as desired. In the embodiment of FIG. 5, three sectors 22 are defined, each of which encompasses a respective set of blocks 24. The payload capacity $C_S(i)$ of each sector 22 is determined by the number of blocks 24 assigned to that sector 22, and can be used in the manner described above to determine respective values of the stuffing ratio ($\alpha$), NFS(i), FS1(i) and FS2(i) for that sector 22. In order to enable successful DEMUXing, information identifying the number $n_s$ of sectors and the blocks 24 allocated to each sector 22, would have to be inserted into the container along with FS1(i) and FS2(i) for the sector. Preferably, all of this information will be inserted into the container overhead 14. However, if needed, one or more payload blocks 24 may be used for this purpose. In the embodiment of FIG. 5, the blocks allocated to each sector are identified by indicating a start block of the sector, and the number of contiguous blocks assigned to that sector. In the embodiment of FIG. 5, this information is saved, along with respective values of FS1 and FS2 for each sector, in a reserved payload block.

Methods in accordance with the present invention will be further described below by way of examples in which various client signals are mapped into a transport container 12.

EXAMPLE 1

2*OTU-2+ over 25 Gb/s Logical OTU Container

In this case, the container payload is subdivided into $n_s=2$ sectors, each of which is used to transport an OTU2+ client signal as described above. The stuffing ratio ($\alpha$) and the number ($N_{FS}$) of fixed stuffs required for each sector can be calculated from the ODU2+ line rate ($S_{ODU2+}=10.3995$ Gb/s) and the container's payload capacity ($C_S=11.49$ Gb/s) as follows:

$$\alpha = \frac{C_S}{S_{ODU2+}} - 1 = 0.1044, \text{ and}$$

$$N_{FS} = \left(\frac{3808}{n_S}\right)\alpha$$

$$= 198.84 \text{ (32-bit words)}$$

$$= 6363 \text{ (bits)}$$

It is convenient to represent the integer and fractional components of the NFS using respective separate fields. Thus, $FS1=\text{Int}(N_{FS})=198$ and $FS2=N_{FS}-FS1=0.84$.

In order to MUX the two ODU2+ signals into the container payload, the calculated number of fixed stuffs (in case, $N_{FS}=198.84$ 32-bit words) are inserted into each sector, along with a respective one of the two ODU2+ signals. $FS1=198$ and $FS2=0.84$ are then inserted into respective fields of the container's overhead 14.

As described above, it is a simple matter to insert an integer number (i.e. FS1=198) of whole fixed stuffs into each sector 22 of the container payload 16. The fractional (FS2=0.84) fixed stuff can be accommodated in a variety of ways. In the embodiments described above, this is accomplished by inserting an additional (whole) fixed stuff into each sector of every Nth container, where N=1/FS2. For embodiments in which FS2 is represented as a byte value, a more robust method is to represent the decimal value of FS2 as a byte value, which can be accomplished by multiplying the decimal value by 256, thus FS2'=FS2*256; and then, for each bit FS2'[i], having a value of binary "1", inserting an additional fixed stuff into the payload of each $N^{th}$ container, where $N=2^{8-i}$. In the current example FS2=0.84, so: FS2'=0.84*256=215=[01101011], in which bits FS2'[i] i=1, 2, 4, 6 and 7 have a value of binary "1". Accordingly, a respective whole stuff will be inserted into the payload of each $2^{8-1}=128^{th}$, $2^{8-2}=64^{th}$, $2^{8-4}=16^{th}$, $2^{8-6}=4^{th}$, and $2^{8-7}=2^{nd}$ containers.

Figure 6:
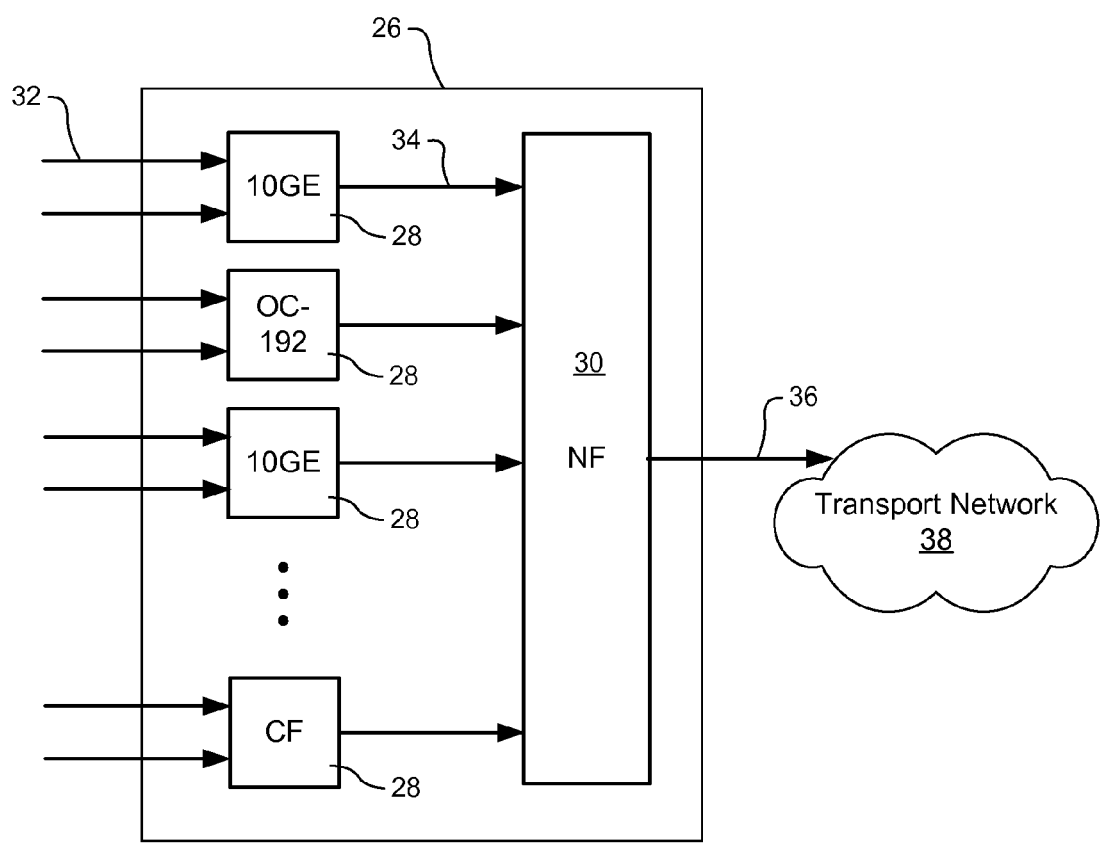
FIG. 6 is a is a block diagram schematically illustrating a representative interface implementing in accordance with the present invention.

Those of ordinary skill in the art will appreciate that the above described methods may be implemented in any suitable combination of hardware and software. For example, a Field Programmable Gate Array (FPGA) or Application Specific Integrated Circuit (ASIC) may be used for this purpose. FIG. 6 is a block diagram schematically illustrating principle elements of a network interface 26 that is particularly useful for flexible transparent mux/demux of client traffic.

In the embodiment of FIG. 6, the network interface includes a plurality of client-facing blocks 28, and a network facing block 30. Each client-facing block implements the methods described above with reference to FIGS. 1-5 to mux client traffic 32 to an intra-node container 34 having a predetermined payload capacity. The network facing block 30 also implements the methods described above with reference to FIGS. 1-5, but in this case to mux intra-node container traffic 34 into a transport container 36 of the transport network 38. In some embodiments, the intra-node container 34 is an overclocked OTU-2 (OTU-2+) signal, as described above.

However, in principle any desired intra-node container capacity may be used.

With this arrangement, low-cost ASIC's or Field Programmable Gate Arrays (FPGAs) can be used to implement each client-facing and network-facing blocks 28, 30, while still achieving a highly flexible interface system. In particular, a plurality of different client-facing block types can readily be designed, each of which is optimized to mux a particular type of client traffic to the intra-node container 34. Thus, for example, one client-facing block type may be optimized for muxing 10 G-Ethernet PHY signals into the intra-node container 34, while another is optimized for muxing SONET/SDH OC-192 signals into the intra-node container 34. In some cases, highly sophisticated client signal handling functionality can be built into certain client-facing block types. For example, a certain client-facing block type may be designed to support processing of SONET Section and Line overhead, so that the interface 26 can emulate a Line termination of a SONET/SDH network. As will be appreciated, hardware provisioning of a particular network interface can thus be accomplished by assembling a desired number of copies of each of the various client-facing block types needed to satisfy client traffic requirements.

Similarly, the cost of the network-facing block 30 can be constrained, because it does not need to support muxing of the full range of different client traffic types. Rather, the network-facing block the can be optimized for muxing intra-node container traffic into network transport containers 36.

The embodiments of the invention described above are intended to be illustrative only. The scope of the invention is therefore intended to be limited solely by the scope of the appended claims.

We claim:

1. A method of bit-transparently multiplexing a plurality of client signals into a fixed length container of a sequence of fixed length containers for transport through a communications network coupled to a network interface, the method comprising steps of:

subdividing a payload of the fixed length container into sectors, and assigning each of the plurality of client signals to a respective one of the sectors;

for each client signal and its respective sector:

computing a respective number (Nfs) of fixed stuffs based on a nominal line rate of the client signal and a payload capacity of the respective sector, each respective number Nfs of fixed stuffs being represented as a respective integer number FS1 of fixed stuffs and a fractional number FS2 of fixed stuffs;

inserting bytes of each client signal together with its respective number Nfs of fixed stuffs into each respective sector of the payload of the container;

inserting the computed numbers Nfs of fixed stuffs in predetermined locations of the container; and the step of inserting a respective number Nfs of fixed stuffs into each respective sector of the payload of the container comprising:

inserting the respective integer number FS1 of fixed stuffs into each respective sector of the payload; and inserting an additional fixed stuff into the respective sector of the payload of each Nth fixed length container of the sequence of fixed length containers, where N=1/FS2.

2. A method of bit-transparently multiplexing a client signal into a fixed length container of a sequence of fixed length containers for transport through a communications network coupled to a network interface wherein the client signal has a line rate that varies around a nominal line rate, the method comprising steps of:

computing a number (Nfs) of fixed stuffs based on a nominal line rate of the client signal and a payload capacity of the fixed length container, the number Nfs of fixed stuffs being represented as an integer number FS1 of fixed stuffs and a fractional number FS2 of fixed stuffs;

computing a variable number of stuff bytes required to keep the client signal aligned with the fixed length container;

inserting bytes of the client signal together with the computed number Nfs of fixed stuffs and the computed variable number of stuff bytes into a payload of the fixed length container;
inserting the computed number Nfs of fixed stuffs and the computed variable number of stuff bytes in predetermined locations of the fixed length container; and
the step of inserting the computed number Nfs of fixed stuffs into the payload of the fixed length container comprising:
inserting the integer number FS1 of fixed stuffs into the payload; and
inserting an additional fixed stuff into the payload of each Nth fixed length container of the sequence of fixed length containers, where N=1/FS2.

3. An interface for bit-transparently multiplexing a plurality of client signals into a fixed length container of a sequence of fixed length containers for transport through a communications network coupled to the interface, the interface comprising:
a network-facing element configured to multiplex a plurality of client signals into a fixed length container having a predetermined payload capacity; and
at least one client-facing element being configured:
to subdivide a payload of the fixed length container into sectors, and to assign each of the plurality of client signals to a respective one of the sectors;
for each client signal and its respective sector, to compute a respective number (Nfs) of fixed stuffs based on the nominal line rate of the client signal and a payload capacity of the respective sector, each respective number Nfs of fixed stuffs being represented as a respective integer number FS1 of fixed stuffs and a fractional number FS2 of fixed stuffs, and
the at least one client-facing element being further configured:
to insert bytes of each client signal together with its respective computed number Nfs of fixed stuffs into each respective sector of the payload of the fixed length container;
to insert the computed numbers Nfs of fixed stuffs in predetermined locations of the fixed length container
to insert the respective integer number FS1 of fixed stuffs into each respective sector of the payload; and
to insert an additional fixed stuff into the respective sector of the payload of each Nth fixed length container of the sequence of fixed length containers, where N=1/FS2.

4. An interface for bit-transparently multiplexing a plurality of client signals into a fixed length container of a sequence of fixed length containers for transport through a communications network coupled to the interface, the fixed length container being a logical Optical Transport Network (OTN) container, the interface comprising:
a network-facing element configured to multiplex a plurality of client signals into a fixed length container having a predetermined payload capacity; and
at least one client-facing element being configured:
to compute a number (Nfs) of fixed stuffs based on the nominal line rate of a client signal and a payload capacity of the fixed length container, the computed number Nfs of fixed stuffs can be represented as an integer number FS1 of fixed stuffs and a fractional number FS2 of fixed stuffs, and the least one client-facing element being further configured:
to compute a variable number of stuff bytes required to keep the client signal aligned with the fixed length container;
to insert bytes of the client signal together with the computed number Nfs of fixed stuffs and the computed variable number of stuff bytes into a payload of the fixed length container;
to insert the computed number Nfs of fixed stuffs and the computed variable number of stuff bytes in predetermined locations of the fixed length container;
to insert the integer number FS1 of fixed stuffs into the payload; and
to insert an additional fixed stuff into the payload of each Nth fixed length container of the sequence of fixed length containers, where N=1/FS2.

5. A method of bit-transparently multiplexing a plurality of client signals into a fixed length container for transport through a communications network coupled to a network interface, the method comprising steps of:
subdividing a payload of the fixed length container into a number of sectors, each sector being allocated at least one block, and assigning each of the plurality of client signals to a respective one of the sectors;
for each client signal and its respective sector:
computing a respective number (Nfs) of fixed stuffs based on a nominal line rate of the client signal and a payload capacity of the respective sector;
inserting bytes of each client signal together with its respective number Nfs of fixed stuffs into the payload of the container;
inserting the computed numbers Nfs of fixed stuffs, the number of sectors, and for each sector, the number of blocks allocated to the sector, in predetermined locations of the fixed length container; and
each respective number Nfs of fixed stuffs can be represented as a respective integer number FS1 of fixed stuffs and a fractional number FS2 of fixed stuffs, and the step of inserting a respective number Nfs of fixed stuffs into each respective sector of the payload of the container comprises:
inserting the respective integer number FS1 of fixed stuffs into each respective sector of the payload; and
inserting an additional fixed stuff into the respective sector of the payload of each Nth fixed length container of a sequence of fixed length container, where N=1/FS2.

6. A method of bit-transparently multiplexing a client signal into a fixed length container for transport through a communications network coupled to a network interface wherein the client signal has a line rate that varies around a nominal line rate, the method comprising steps of:
subdividing a payload of the fixed length container into a number of sectors, each sector being allocated at least one block, and assigning each of a plurality of client signals to a respective one of the sectors;
for each client signal and its respective sector;
computing a number (Nfs) of fixed stuffs based on a nominal line rate of the client signal and a payload capacity of the respective sector;
computing a variable number of stuff bytes required to keep the client signal aligned with the fixed length container;
inserting bytes of the client signal together with the computed number Nfs of fixed stuffs and the computed variable number of stuff bytes into a payload of the container; and inserting the computed number Nfs of fixed stuffs, the computed variable number of stuff bytes, the number of sectors, and for each sector, the number of blocks allocated to the sector, in predetermined locations of the fixed length container; and the number Nfs of fixed stuffs can be represented as an integer number FS1 of fixed stuffs and a fractional number FS2 of fixed stuffs, the step of inserting the computed number Nfs of fixed stuffs into the payload of the container comprises:

inserting the integer number FS1 of fixed stuffs into the respective sector of the payload; and inserting an additional fixed stuff into the respective sector of the payload of each Nth fixed length container of a sequence of fixed length container, where N=1/FS2.

7. An interface for bit-transparently multiplexing a plurality of client signals into a fixed length container for transport through a communications network coupled to the interface, the interface comprising:

a network-facing element configured to multiplex a plurality of client signals into a fixed length container having a predetermined payload capacity; and at least one client-facing element configured:

to subdivide a payload of the fixed length container into a number of sectors, each sector being allocated at least one block, and to assign each of the plurality of client signals to a respective one of the sectors;

for each client signal and its respective sector:

to compute a respective number (Nfs) of fixed stuffs based on the nominal line rate of the client signal and a payload capacity of the respective sector;

to insert bytes of each client signal together with its respective number Nfs of fixed stuffs into each respective sector of the payload of the fixed length container; and to insert the computed numbers Nfs of fixed stuffs, the number of sectors, and for each sector, the number of blocks allocated to the sector, in predetermined locations of the fixed length container; and each respective number Nfs of fixed stuffs can be represented as an respective integer number FS1 of fixed stuffs and a fractional number FS2 of fixed stuffs, and the client-facing element is configured:

to insert the respective integer number FS1 of fixed stuffs into each respective sector of the payload; and to insert an additional fixed stuff into the respective sector of the payload of each Nth fixed length container of a sequence of fixed length containers, where N=1/FS2.

8. An interface for bit-transparently multiplexing a plurality of client signals into a fixed length container for transport through a communications network coupled to the interface, the interface comprising:

a network-facing element configured to multiplex a plurality of client signals into a fixed length container subdivided into a number of sectors, each sector being allocated at least one block, each sector having a respective one of the client signals and having a predetermined payload capacity; and at least one client-facing element configured, for each client signal:

to compute a number (Nfs) of fixed stuffs based on the nominal line rate of the client signal and a payload capacity of the respective sector;

to compute a variable number of stuff bytes required to keep the client signal aligned with the fixed length container;

to insert bytes of the client signal together with the computed number Nfs of fixed stuffs and the computed variable number of stuff bytes into a payload of the fixed length container;

to insert the computed number Nfs of fixed stuffs, the computed variable number of stuff bytes, the number of sectors, and for each sector, the number of blocks allocated to the sector, in predetermined locations of the fixed length container; and the number Nfs of fixed stuffs can be represented as a integer number FS1 of fixed stuffs and a fractional number FS2 of fixed stuffs, and the client-facing element is configured:

to insert the integer number FS1 of fixed stuffs into each respective sector of the payload; and to insert an additional fixed stuff into the respective sector of the payload of each Nth fixed length container of a sequence of fixed length containers, where N=1/FS2.

* * * * *